United States Patent [19]

Malloy, III et al.

[11] Patent Number: 5,247,548
[45] Date of Patent: Sep. 21, 1993

[54] THERMIONIC REACTOR

[75] Inventors: John D. Malloy, III, Lynchburg; Richard F. Rochow; Kurt O. Westerman, both of Forest, all of Va.

[73] Assignee: The Babcock & Wilcox Company, New Orleans, La.

[21] Appl. No.: 882,391

[22] Filed: Jan. 17, 1992

[51] Int. Cl.⁵ .............................................. G21C 3/40
[52] U.S. Cl. ................................... 376/318; 376/321; 376/909
[58] Field of Search ............... 376/317, 318, 320, 909, 376/321

[56] References Cited

U.S. PATENT DOCUMENTS

| | | | |
|---|---|---|---|
| 3,378,449 | 4/1968 | Roberts et al. | 376/320 |
| 4,246,751 | 1/1981 | Retallick | 60/203 |
| 4,830,817 | 5/1989 | Schulten | 376/320 |

Primary Examiner—Donald P. Walsh
Assistant Examiner—Frederick H. Voss
Attorney, Agent, or Firm—Robert J. Edwards; D. Neil LaHaye

[57] ABSTRACT

A thermionic reactor for providing electrical power and propulsion power. A reactor vessel has a plurality of thermionic heat pipe modules located therein and spaced apart on a hexagonal pitch. Nuclear fuel elements are positioned in the spaces between the thermionic heat pipe modules. Insulating material is provided between the reactor vessel and the array of thermionic heat pipe modules and nuclear fuel elements. Propulsion power is provided by a propellant storage tank and propellant nozzle in fluid communication with opposite ends of the reactor vessel. The thermionic heat pipe modules serve to produce electricity and aid in removal of waste heat.

14 Claims, 2 Drawing Sheets

THERMIONIC REACTOR

BACKGROUND OF THE INVENTION

1. Field of the Invention

The present invention is generally related to nuclear reactors and more particularly to thermionic reactors.

2. General Background

Thermionic reactors use thermionic conversion devices for the direct conversion of heat to electricity. Thermionic converters operate in the following general manner. Heating of an element, such as the cathode, serves to dislodge electrons from the lattice structure of the cathode material by increasing their kinetic energy. These electrons flow to another element, such as the anode, which is maintained at a lower temperature. By connecting the two electrodes to a load, an electrical current is established and current flows which operates an electrically powered device. The use of thermionic devices in combination with nuclear reactors is particularly advantageous for reactors designed for use in outer space due to the potential for mass reduction while maintaining equal power output.

Thermionic reactor design has been concentrated on two different approaches, excore thermionic concepts and thermionic fuel elements. Excore thermionic reactors typically utilize a cylindrical reactor core having a high conductivity nuclear fuel. $UC_2$ in graphite is usually used as the fuel. The thermionic devices are located exterior of the core. Thermal radiation from the nuclear fuel causes planar thermionic diodes to generate electrical power. Nuclear fuel swells at the high temperatures required for efficient thermionic diode operation. Isolating the diodes from the fuel prevents the dimensional changes of the fuel from affecting the precise tolerances needed for efficient thermionic diode operation. The excore systems require the use of less developed fuels such as $UC_2$ to prevent excessive fuel temperatures because the heat must be conducted through the entire core before reaching the thermionic diodes outside the core. Even with a fuel having a high heat conductivity, this type of reactor is limited to relatively low power levels to maintain acceptable fuel temperatures. The second type of thermionic reactor utilizes thermionic fuel elements (TFE's). The TFE is a cylindrical thermionic diode with nuclear fuel in the center of the diode. The fuel cladding becomes the emitter and must be designed to accommodate fuel swelling and chemical attack by the numerous chemical species generated during the fission process. This concept can use a more developed fuel such as $UO_2$ because the heat conductive path from the center of the fuel pellet to the thermionic diode is short. This concept can also be scaled to larger power levels because the TFE becomes a modular fuel element. However, accommodation of fuel swelling while maintaining the precise tolerances required for efficient thermionic diode operation present significant development problems for this design.

A variation of the excore design utilizes an annular core with thermionic diodes around the outside and the inside of the annulus. This variation uses a thermionic heat pipe module (THPM). The THPM incorporates a cylindrical thermionic diode similar to the TFE but with a central heat pipe for heat rejection. The device provides both power conversion and waste heat removal in a single module. This configuration provides an advantage over other excore concepts because it uses $UO_2$ fuel instead of carbide fuel but still presents many of the other disadvantages associated with excore concepts because of its limited size potential and its high fuel temperatures.

It can be seen that current approaches to thermionic reactor design have been unable to address certain restrictions such as size and the type of fuel that can be used. These reactors only produce electrical power. If propulsive thrust is needed, either electric thrusters must be used or a separate propulsion system provided. Both alternatives can result in significantly heavier space craft. The electric thruster can be heavier system because of its very low thrust level. The use of a separate propulsion system will be heavier because of the additional components required. The use of electric thrusters can also increase space craft mass because their low thrust requires additional propellant to overcome gravity losses.

SUMMARY OF THE INVENTION

The present invention addresses the above needs in a straightforward manner. What is provided is a thermionic reactor capable of producing electrical power and propulsive thrust for space vehicles. A reactor vessel has a plurality of thermionic heat pipe modules located therein and spaced apart from each other. A plurality of nuclear fuel elements are located inside the reactor vessel and positioned in the spaces between the thermionic heat pipe modules. Insulation is provided between the reactor vessel and the array of thermionic heat pipe modules and fuel elements. Heat conduction from the fuel elements to the thermionic heat pipe modules produces electricity. The space between the thermionic heat pipe modules and the fuel elements is used to heat a propellant as it passes through the reactor to a propellant nozzle for producing thrust. The thermionic heat pipe modules are in communication with a waste heat radiator exterior to the reactor vessel for removing excessive or waste heat from the reactor.

BRIEF DESCRIPTION OF THE DRAWINGS

For a further understanding of the nature and objects of the present invention reference should be made to the following description taken in conjunction with the accompanying drawings in which like parts are given like reference numerals, and wherein.

DETAILED DESCRIPTION OF THE PREFERRED EMBODIMENT

Figure 1:
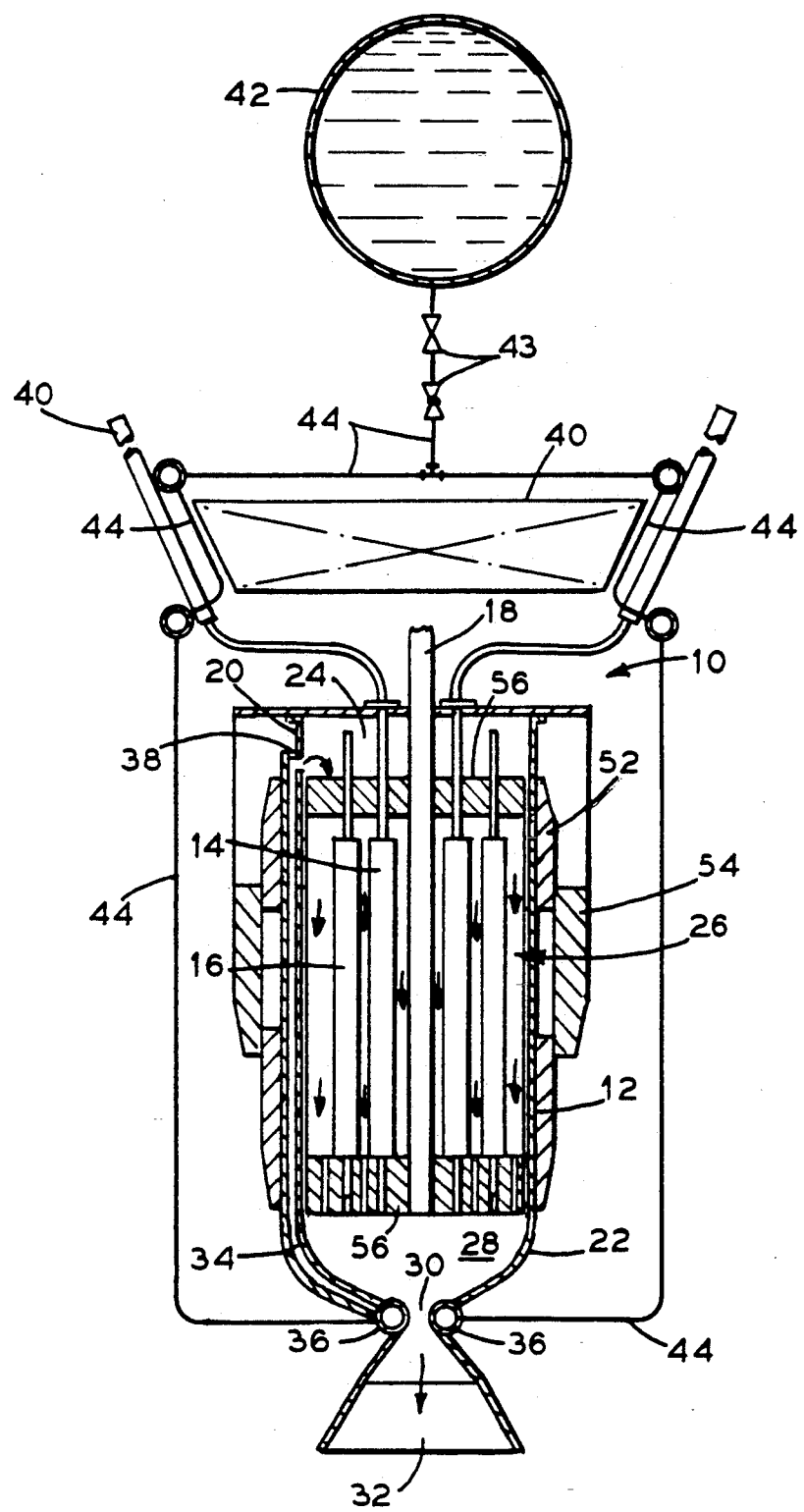
FIG. 1 is a longitudinal sectional schematic view of the invention.
Figure 2:
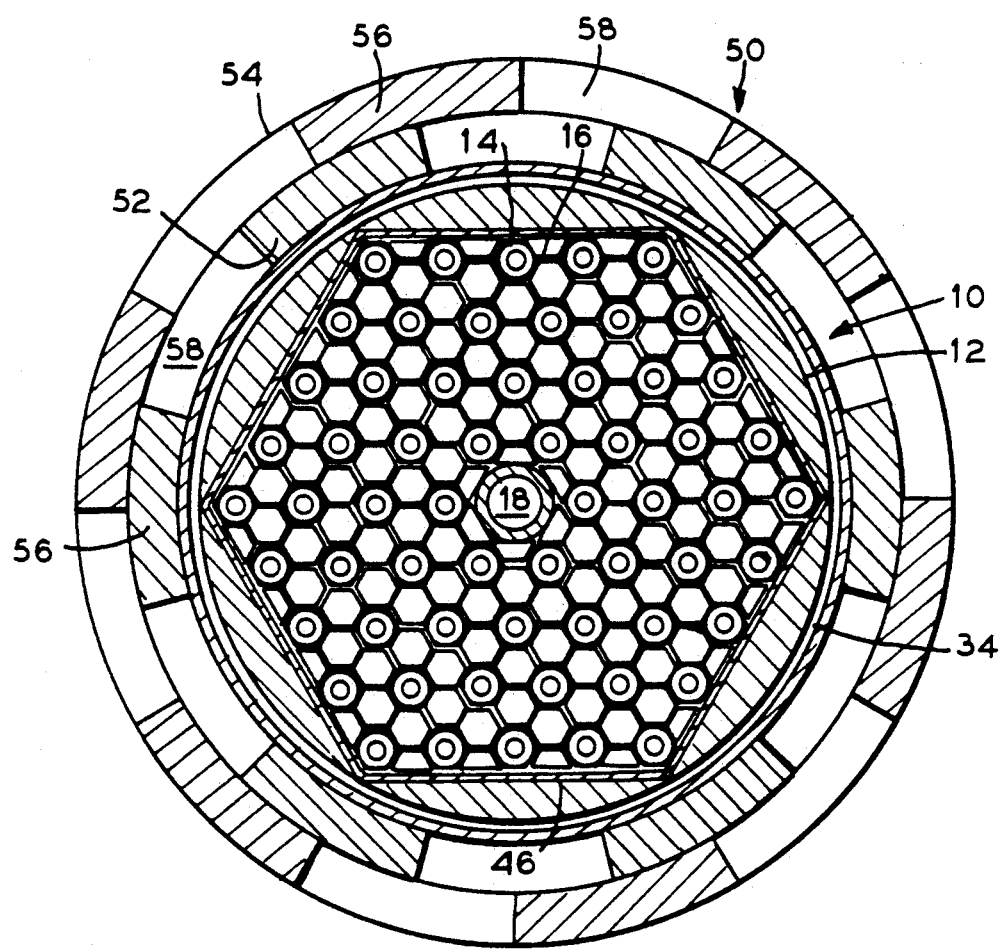
FIG. 2 is a radial sectional view of the invention.

Referring to the drawings, it is seen in FIG. 1 and 2 that the invention is generally indicated by the numeral 10. Thermionic reactor 10 is generally comprised of reactor vessel 12, thermionic heat pipe modules 14, nuclear fuel elements 16, and control rod 18.

As seen in FIG. 1 reactor vessel 12 is of a generally cylindrical shape having first and second ends 20,22. Second end 22 is substantially semicircular in shape in the preferred embodiment. Reactor vessel 12 is formed from materials known in the industry to be suited for this type of use. First end 20 provides an inlet plenum 24 for coolant/propellant gas above core 26. Second end 22 provides a outlet plenum 28 for coolant/propellant gas below core 26. Second end 22 is connected to the nozzle throat 30 for directing exiting coolant/propellant to propellant nozzle 32. An inlet header 36 at the nozzle throat 30 maintains acceptable nozzle temperatures. Reactor vessel 12 is provided with a passage 34 along its exterior that extends from inlet header 36 to inlet plenum 24. Coolant/propellant enters at the inlet header 36, flows through passage 34, and exits into inlet plenum 24. Coolant/propellant travels from inlet plenum 24 through core 26 and the spaces between thermionic heat pipe modules 14 and nuclear fuel elements 16 to outlet plenum 28, nozzle throat 30, and propellant nozzle 32 where propulsive thrust is produced.

Thermionic heat pipe modules 14, seen in FIG. 2, are cylindrical in cross section and have their length equal to that of fuel elements 16. Each thermionic heat pipe module 14 is formed from a cylindrical thermionic diode and a tube inside the central space of the diode that serves as a central heat pipe for heat rejection. Heating of the thermionic diodes by thermal radiation from nuclear fuel elements 16 produces usable electrical power as described above. The tubes that form the central heat pipes of thermionic heat pipe modules 14 extend axially beyond core 26 and first end 20 to waste heat radiator 40. As best seen in FIG. 2, thermionic heat pipe modules 14 are spaced apart from each other on a hexagonal pitch. Modules 14 are spaced apart from each other at a predetermined distance to allow placement of nuclear fuel elements 16 in the spaces between modules 14. Arranging the modules and fuel elements on a hexagonal pitch makes the most efficient use of the area in core 26. Waste heat radiator 40 provides a waste heat rejection means for removing excessive or residual heat from the reactor. Radiation of heat from the central heat pipes by waste heat radiator 40 acts as a passive heat removal system by natural convection of two phase fluid inside the central heat pipes and waste heat radiator 40.

Nuclear fuel elements 16 are located inside core 26 of reactor vessel 12 and positioned in the spaces between thermionic heat pipe modules 14. As seen in FIG. 2, nuclear fuel elements 16 are arranged on a pitch complementary to heat pipe modules 14. Nuclear fuel elements 16 may utilize fuel pellets or a fuel particle bed according to the type of coolant used. Although nuclear fuel elements 16 may be circular in cross section, the preferred embodiment utilizes fuel elements that each have six distinct sides. This results in a more efficient use of space for fuel loading. A second advantage is that the heat conduction distance between the center and the outside face of the nuclear fuel elements 16 is relatively short. This reduces the temperature differential between the face and the center of the nuclear fuel even when a fuel with relatively poor thermal conductivity such as $UO_2$ is used. Therefore, more developed fuels may be used in this configuration. Arranging nuclear fuel elements 16 in the spaces between modules 14 and in a pitch complementary to modules 14 also provides an advantage of the efficient use of space within reactor vessel 12. The proximity of the nuclear fuel to the thermionic diodes allows the reactor to be scaled up to high power levels without incurring unacceptably high fuel temperatures. The physical separation of modules 14 from nuclear fuel elements 16 is also beneficial because it eliminates the potential distortion of the thermionic diodes, as a result of fuel swelling, that would result in the loss of the precise tolerances required for efficient thermionic diode performance. The separation of modules 14 from nuclear fuel elements 16 also allows testing of the system without nuclear facilities by inserting electrical heaters into the spaces normally occupied by nuclear fuel elements 16. As seen in the preferred embodiment of FIG. 2, thermionic heat pipe modules 14 are spaced apart such that each nuclear fuel element 16 is adjacent at least one thermionic heat pipe module 14.

Means for controlling the reactivity of thermionic reactor 10 is provided in the form of control rod 18 as seen in FIG. 2. Control rod 18 is movably positioned inside reactor vessel 12 in a manner known in the art whereby control rod 18 may be selectively inserted into or removed from core 26. Although only one control rod 18 is shown for ease of illustration, it should be understood that multiple control rods 18 may be spaced throughout core 26 to provide effective control. The contral rod may be supplemented by moving reflectors 50 to increase or decrease the number of neutrons reflected back to the core 26.

Means for providing propulsive thrust utilizing thermionic reactor 10 is provided in the form of propellant storage tank 42 and propellant nozzle 32. Propellant storage tank 42 is filled with a suitable propellant such as liquid hydrogen. Upon demand, propellant travels from propellant storage tank 42 through control valves 43 and propellant line 44 to inlet header 36. As best seen in FIG. 1, propellant line 44 is adjacent waste heat radiator 40 for the purpose of preheating the propellant. Propellant line 44 is in fluid communication with inlet header 36. Propellant is preheated by waste heat radiator 40 and travels through propellant line 44 to inlet header 36 where it is further heated. The propellant then travels through passage 34 on the exterior of reactor vessel 12 and into reactor vessel 12 through inlet header 38. As indicated by the arrows in FIG. 1, the propellant travels from first end 20 to second end 22 through the spaces between thermionic heat pipe modules 14 and nuclear fuel elements 16. This causes increased heating and expansion of the now gaseous propellant as it travels into outlet plenum 28 and to propellant nozzle 32. Propellant nozzle 32 is a type known in the industry that is designed to accelerate the propellant and produce propulsive thrust. In this manner, thermionic reactor 10 may be incorporated as part of a satellite to be launched into space that is capable of providing thrust during the later stages of a launch for achieving orbit and for maneuvering while in orbit a well as providing electrical power to the components of the satellite.

Reactor vessel 12 is preferably provided with insulating material between its inner surface and modules 14 and fuel elements 16. As seen in FIG. 2, two levels of insulation are provided. First insulting material 46 is preferably formed from multiple layers of a thin material that has a low emittance of heat from one layer to the next. For applications where the reactor is to be used in outer space, a metal foil such as tungsten is particularly suitable since it works only in a vacuum. Second insulating material 48 may be formed from any solid insulating material having acceptable insulating and mass properties. Thermal insulation of reactor vessel 12 serves the dual purpose of retaining heat within the reactor for more efficient operation and protecting external components from the heat generated.

Neutron reflector 50 may also be used to maintain and control reactivity. Neutron reflector 50 illustrated in FIG. 2 is a radial reflector having inner and outer rings 52, 54. Each ring is provided with alternating radial sections of neutron reflecting material 56 and non-neutron reflecting material or holes 58 that extend some portion of the length of neutron reflector 50.

Rings 52, 54 are rotatable relative to each other for varying the amount of neutrons reflected back into core 26. As seen in FIG. 2, neutron reflecting material 56 may also be provided at either end of core 26 within reactor vessel 12.

In operation, thermal radiation from nuclear fuel elements 16 heats thermionic heat pipe modules 14. This causes production of electrical power by cylindrical thermionic diodes in modules 14. A heat pipe in each module 14 in communication with waste heat radiator 40 transfers heat thereto for removal of excessive or residual heat. Propellant/coolant from tank 42 is directed through reactor vessel 12 where it is heated and then travels through propellant nozzle 32. Propellant nozzle 32 accelerates the propellant to produce propulsive thrust.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A thermionic reactor, comprising:
   a. a reactor vessel having first and second ends;
   b. a plurality of thermionic heat pipe modules located inside said reactor vessel and spaced apart from each other in a hexagonal pitch array;
   c. a plurality of nuclear fuel elements located inside said rector vessel and positioned in the spaces between said thermionic heat pipe modules in a hexagonal pitch array whereby a space is maintained between each of said thermionic heat pipe modules and said nuclear fuel elements and each of said fuel elements is adjacent at least one of said thermionic heat pipe modules; and
   d. a control rod movably positioned inside said reactor vessel.

2. The reactor of claim 1, wherein said nuclear fuel elements each have six sides.

3. The reactor of claim 1, further comprising insulating material positioned between said reactor vessel and the array of said thermionic heat pipe modules and said nuclear fuel elements.

4. The reactor of claim 1, further comprising waste heat rejection means.

5. The reactor of claim 1, further comprising means for providing propulsion power from said reactor.

6. The reactor of claim 5, wherein said means for providing propulsion comprises:
   a. a propellant storage tank in fluid communication with
      a passage at the second end of said reactor vessel that directs propellant to the interior of the first end of said reactor vessel whereby propellant flows through the spaces between said thermionic heat pipe modules and said fuel elements; and
   b. a propellant nozzle in fluid communication with the second end of said reactor vessel whereby propellant travelling through said reactor is directed to said propellant nozzle.

7. A thermionic reactor, comprising:
   a. a reactor vessel having first and second ends;
   b. a plurality of thermionic heat pipe modules located inside said reactor vessel and spaced apart from each other in a hexagonal pitch array;
   c. a plurality of nuclear fuel elements located inside said reactor vessel and positioned in the spaces between said thermionic heat pipe modules in a hexagonal pitch array whereby a space is maintained between each of said thermionic heat pipe modules and said nuclear fuel elements and each of said fuel elements is adjacent at least one of said thermionic heat pipe modules;
   d. a control rod movably positioned inside said reactor vessel;
   e. waste heat rejection means in operative communication with said reactor vessel; and
   f. means for providing propulsion power from said reactor.

8. The rector of claim 7, wherein said nuclear fuel elements each have six sides.

9. The reactor of claim 7, further comprising insulating material positioned between said reactor vessel and the array of said thermionic heat pipe modules and said nuclear fuel elements.

10. The reactor of claim 8, wherein said means for providing propulsion comprises:
    a. a propellant storage tank in fluid communication with
       a passage at the second end of said reactor vessel that directs propellant to the interior of the first end of said reactor vessel whereby propellant flows through the spaces between said thermionic heat pipe modules and said fuel elements; and
    b. a propellant nozzle in fluid communication with the second end of said reactor vessel whereby propellant travelling through said reactor is directed to said propellant nozzle.

11. A thermionic reactor, comprising:
    a. a reactor vessel having first and second ends;
    b. a plurality of thermionic heat pipe modules located inside said reactor vessel and spaced apart from each other in a hexagonal pitch array;
    c. a plurality of nuclear fuel elements located inside said reactor vessel and positioned in the spaces between said thermionic heat pipe modules in a hexagonal pitch array whereby a space is maintained between each of said thermionic heat pipe modules and said nuclear fuel elements and each of said fuel elements is adjacent at least one of said thermionic heat pipe modules;
    d. a control rod movably positioned inside said reactor vessel;
    e. waste heat rejection means in operative communication with said reactor vessel;
    g. means for providing propulsion power from said reactor, comprising:
       i. a propellant storage tank in fluid communication with a passage at the second end of said reactor vessel that directs propellant to the interior of the first end of said reactor vessel whereby propellant flows through the spaces between said thermionic heat pipe modules and said fuel elements; and
       ii. a propellant nozzle in fluid communication with the second end of said reactor vessel whereby propellant travelling through said reactor is directed to said propellant nozzle.

12. The reactor of claim 11, wherein said nuclear fuel elements each have six sides.

13. The reactor of claim 11, wherein the propellant is preheated by said waste heat rejection means before entering the passage at the second end of said reactor.

14. The reactor of claim 11, further comprising:
   a. an inner and outer ring around the core of the reactor, said inner and outer rings each being provided with alternating radial sections of neutron reflecting material and non-neutron reflecting material that extend the length of said rings; and
   b. said inner and outer rings being rotatable relative to each other for controlling the amount of neutrons reflected back into the core of the reactor.

* * * * *

UNITED STATES PATENT AND TRADEMARK OFFICE
CERTIFICATE OF CORRECTION

PATENT NO. : 5,247,548
DATED : September 21, 1993
INVENTOR(S) : John D. Malloy, III, et al It is certified that error appears in the above-indentified patent and that said Letters Patent is hereby corrected as shown below:

Column 6, claim 10, line 21, "claim 8" should read --claim 7--

Signed and Sealed this

Fifteenth Day of March, 1994

Attest:

BRUCE LEHMAN

Attesting Officer

*Commissioner of Patents and Trademarks*

UNITED STATES PATENT AND TRADEMARK OFFICE
CERTIFICATE OF CORRECTION

PATENT NO. : 5,247,548
DATED : September 21, 1993
INVENTOR(S) : John D. Malloy, III, et al It is certified that error appears in the above-indentified patent and that said Letters Patent is hereby corrected as shown below:

Cover Page, Item (21) Appl. No. should be 822,391

Signed and Sealed this

Third Day of March, 1998

*Attest:*

BRUCE LEHMAN

*Attesting Officer*     *Commissioner of Patents and Trademarks*